United States Patent [19]

Mutoh et al.

[11] Patent Number: 5,606,306
[45] Date of Patent: Feb. 25, 1997

[54] VEHICLE ANTI-THEFT ENGINE CONTROL DEVICE

[75] Inventors: Eiji Mutoh; Susumu Maeda; Shinichi Kubota, all of Wako, Japan

[73] Assignee: Honda Giken Kogyo Kabushiki Kaisha, Tokyo, Japan

[21] Appl. No.: 464,376

[22] Filed: Jun. 5, 1995

[30] Foreign Application Priority Data

Sep. 28, 1994 [JP] Japan .................. 6-257369

[51] Int. Cl.⁶ .................................. B60R 25/10
[52] U.S. Cl. .................. 340/426; 307/102; 307/10.5
[58] Field of Search ................ 340/426, 425.5; 307/10.2, 10.5

[56] References Cited

U.S. PATENT DOCUMENTS

| | | | |
|---|---|---|---|
| 4,291,237 | 9/1981 | Kitano | 307/10.3 |
| 4,366,466 | 12/1982 | Lutz | 307/10.5 |
| 4,749,873 | 6/1988 | Mutoh et al. | 307/10.2 |
| 4,965,460 | 10/1990 | Tanaka et al. | 307/10.2 |
| 5,315,286 | 5/1994 | Nolan | 340/426 |

FOREIGN PATENT DOCUMENTS

| | | |
|---|---|---|
| 0372741 | 6/1990 | European Pat. Off. |
| 0377128 | 7/1990 | European Pat. Off. |
| 0637529 | 2/1995 | European Pat. Off. |
| 4338637 | 6/1994 | Germany |
| 4309342 | 9/1994 | Germany |
| 88-50204 | 12/1988 | Japan |
| 2046827 | 11/1980 | United Kingdom |

*Primary Examiner*—Jeffery Hofsass
*Assistant Examiner*—Mohammed R. Ghannam
*Attorney, Agent, or Firm*—Pollock, Vande Sande & Priddy

[57] ABSTRACT

A vehicle anti-theft engine control device which is also applicable to an engine control unit without a vehicle anti-theft function and which can be used in combination with any type of vehicle anti-theft function as necessary. The engine control device for vehicle anti-theft function comprises an engine control unit for controlling the start of the engine in response to a start permit signal; an anti-theft function provision determining means for determining whether the engine is equipped with a vehicle anti-theft device or not and for issuing a signal indicating the presence or absence of the anti-theft function; a theft detector means for receiving a signal indicating that legitimate starting operation is being performed and for issuing a validation signal; and means for issuing a start permit signal in response to the validation signal received from the theft detector means or the signal indicating the absence of the anti-theft function. The theft detector means is demountably mounted on the circuit board of the engine control means.

4 Claims, 3 Drawing Sheets

5,606,306

VEHICLE ANTI-THEFT ENGINE CONTROL DEVICE

BACKGROUND OF THE INVENTION

1. Field of the Invention

The present invention relates to a vehicle anti-theft engine control device and, more particularly, to a vehicle anti-theft engine control device which can be mounted on both a vehicle which is equipped with an anti-theft function, and a vehicle which is not equipped with the anti-theft function.

2. Description of the Related Art

Among the preventive measures which have been proposed, there is one in which a vehicle is immobilized by a mechanical and/or electrical means if someone attempts to start or drive the vehicle by using an illegitimate key. For this purpose, the key incorporates a memory for an identification code (hereinafter referred to as "ID code"), so that, whenever the key is inserted in a key cylinder to start the vehicle, the key ID code is read and referred to a reference ID code which has been stored in the vehicle beforehand. Only when the read ID code matches the reference ID code, an enable signal is issued and only when an engine control unit or circuit legitimately receives the enable signal, the engine is allowed to be started. In this case, there is an apprehension of the theft being committed by mechanical damage or illegitimate wiring if a binary signal (simple ON/OFF signal) is used as the enable signal. To eliminate such an apprehension, it has been proposed to code the enable signal (refer, for example, to pages 59 to 64 of No. 8, vol. 48, 1994 "Automotive Engineering").

One of such conventional transponder type immobilisers is shown in FIG. 4. A key 2 incorporates a memory (not shown) which has a key ID code (e.g. 64-bit code) stored in advance, and a transmitter 4 for transmitting the key ID code. The transmitter 4 of the key 2 and a key cylinder 5 are coupled with an inductive coil (antenna) 6, for example. When the key 2 is inserted and turned to the ignition position on, an ignition switch 7 is closed. This activates an immobilizer CPU 13 to cause a power amplifier 11 of an immobilizer ECU 10 to supply electric power to the transmitter 4 via the coil 6. The transmitter 4 then reads the key ID code and sends it to the key cylinder 5 side.

The received ID code is detected and digitized by an R/F (high-frequency) circuit 12 in the immobiliser 10, and it is read into the CPU 13 where it is temporarily stored in an appropriate ID code register 13B. An unique reference ID code assigned to each vehicle is stored beforehand in an EEPROM 13A of the CPU 13, this reference ID code is compared with the key ID code which has been read, by a code checking unit 13S of the CPU 13. When the two ID codes match or when they are found to have a predetermined relationship, the enable code is sent from the checking unit 13S to an engine ECU 16. At the same time, a starter relay is energized to rotate a starter motor (not shown).

When the engine ECU 16 has determined and verified the received enable code, the engine ECU 16 controls a fuel injection valve 17, a fuel pump 18, an ignition control unit 20, etc. according to a predetermined procedure and timing to enable the start and travel of the vehicle. If, however, the read key ID code, which has been transmitted from the key 2, does not match the reference ID code stored in the EEPROM 13A or does not have the predetermined relationship thereto, then the checking unit 13S does not send out the enable code. Thus, the start of the vehicle by the engine ECU 16 is prohibited and also the CPU 13 energizes an alarm 14 to give an appropriate alarm or display. In this way, the illegitimate start and running of the engine by the illegitimate key is prevented, thus ensuring the protection of the vehicle against theft.

Japanese Utility Model Publication No. 63-50204 has disclosed a proposal to integrate this type of vehicle anti-theft function or the code checking function into an IC circuit board of a conventional engine control unit which is not equipped with the vehicle anti-theft function.

The transponder type immobilizer described above provides an excellent advantage for preventing the illegitimate engine start and running and for preventing the vehicle theft. In addition, integrating the vehicle anti-theft function and the code checking function into the conventional engine control unit provides an advantage of the need for fewer parts and fewer assembly man-hours. On the other hand, however, there are various kinds of specifications for the vehicle anti-theft function, including the U.S. specifications, EC specifications, and immobilizer specifications. This requires many different types of engine control IC circuit boards for the different kinds of specifications, presenting a problem in that troublesome management is involved and higher development and manufacturing cost is unavoidable.

SUMMARY OF THE INVENTION

An object of the present invention is to provide a vehicle anti-theft engine control device which is commonly applicable to an engine control device not equipped with a vehicle anti-theft Function and which can be used in combination with any type of vehicle anti-theft function as necessary.

The engine control device according to the present invention is provided with an engine control unit or circuit which controls the start of the engine in response to a start permit signal; an anti-theft function provision determining section which determines whether the engine is equipped with a vehicle anti-theft function or not and issues a signal indicating whether the anti-theft function is provided or not; a theft detector means which receives and checks an ID signal (code) indicating that legitimate starting operation is being performed and issues a validation signal; and a means for issuing a start permit signal in response to one of the validation signal received from the theft detector means and the signal indicating the absence or lack of the anti-theft function; the theft detector means being demountably mounted on the circuit board of the engine control section. The section for determining whether the anti-theft function is provided or not and the means for issuing the start permit signal can of course be mounted on the same circuit board of the engine control device. A timer may be further provided to prohibit the supply of the validation signal to the start permit signal issuing means when a preset time has elapsed since the timer was activated in response to the signal indicating the presence or provision of the anti-theft function. The anti-theft function provision determining section is furnished with a divided voltage of a dividing means which is connected between an operating power supply and the ground so as to determined whether an anti-theft device is provided or not on the basis of the value of the divided voltage.

The theft detector means may be demountably mounted on a common circuit board on which the engine ECU is mounted; it checks whether the engine is started by a legitimate key and issues the validation signal when it decides that the engine is being started by the legitimate key. The anti-theft function provision determining section decides whether the engine is equipped with the anti-theft function or not in such a method wherein the divided voltage from the voltage dividing resistors is referred to a table showing voltage vs. anti-theft function and the start permit signal is immediately issued when it is found that the engine is not equipped with the anti-theft function so as to enable the engine control unit to operate. When, however, it is found that the engine is equipped with the anti-theft function, then the checking timer is activated and it is monitored whether the aforesaid validation signal is issued or not within set time. If the validation signal is issued within the set time, then the start permit signal is issued; while if the validation signal is not issued, then it determines that the starting operation is being carried out by an illegitimate key and prohibits the issuance of the start permit signal and also prohibits the receipt of the validation signal from the theft detector means.

DETAILED DESCRIPTION OF THE PREFERRED EMBODIMENTS

Figure 1:
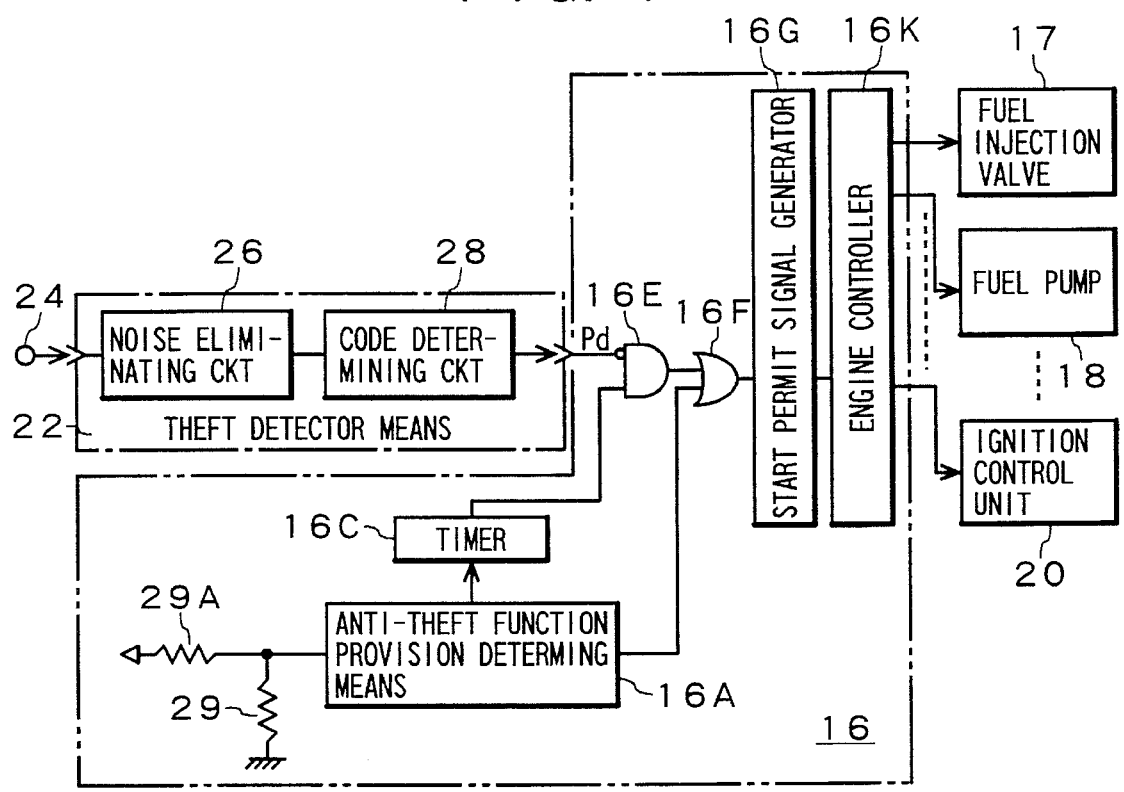
FIG. 1 is a functional block diagram showing principal parts of an embodiment according to the present invention.
Figure 2:
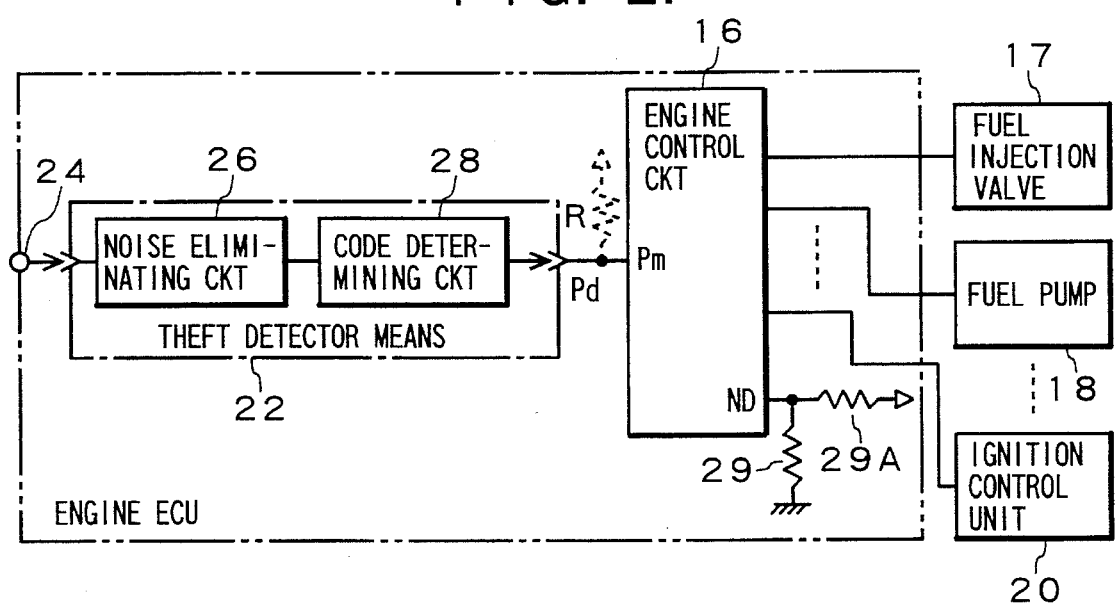
FIG. 2 is a block diagram showing the engine control device with an anti-theft function in FIG. 1.
Figure 4:
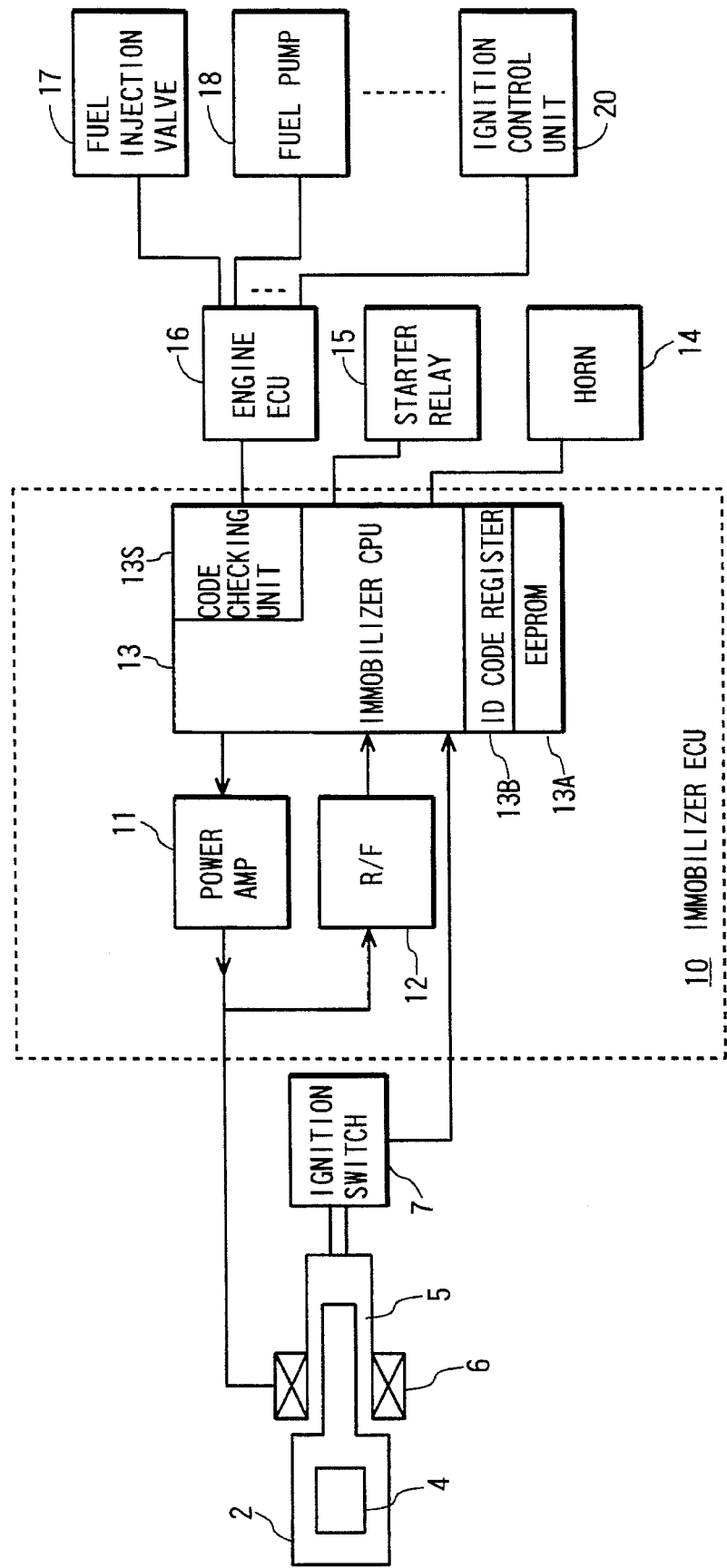
FIG. 4 is a block diagram showing a prior art engine control device with an anti-theft function.

FIG. 1 is a functional block diagram showing the structure of the essential section of the engine control unit (ECU) in the first embodiment of the present invention. FIG. 2 is a block diagram showing the hardware structure of the engine control device of FIG. 1. In these drawings, the same reference numerals as those of FIG. 4 denote the same or equivalent parts.

A theft detector means 22 shown in FIG. 2 comprises a noise eliminating circuit 26 which has an input terminal for receiving the enable signal (code) issued when the key ID code stored in the engine key, for example, coincides with the reference code stored beforehand in the immobilizer (not shown) or the like; and a code determining circuit 28 which determines whether a received signal is a right enable signal or not and which has an output terminal Pd for issuing the validation signal according to the determination result. The theft detector means 22 is demountably mounted on a common circuit board for the engine control circuit 16. The engine control circuit 16 has voltage dividing resistors 29 and 29A which are connected between the operating power supply and ground, the connection node of the two resistors being linked to a port ND (FIG. 2). Port Pm of the engine control circuit 16 is connected to the terminal Pd and also to the operating power supply via pull-up resistor R.

In FIG. 1, the engine control circuit 16 is comprises an anti-theft function provision determining means 16A, a checking timer 16C, an AND gate 16E which receives the outputs of the checking timer 16C and code determining circuit 28 as two inputs thereof, an OR gate 16F, a start permit signal generating section 16G, and an engine control section 16K. The anti-theft function provision determining section 16A determines whether the engine is equipped with the anti-theft device or not by a method wherein the divided voltage appearing at the connection node of the voltage dividing resistors 29 and 29A is referred to a table of voltage vs. anti-theft function which is stored beforehand, and then issues a signal indicating the presence of the anti-theft device or another signal indicating the absence of the anti-theft device. The checking timer 16C measures a limit time allowed for checking an inserted key for legality; it is started in response to the signal indicating the presence of the anti-theft function and it issues a "1" signal, then issues a "0" signal after the limit time has elapsed. The OR gate 16F causes the start permit signal generating section 16G to generate the start permit signal in response to the logical OR of the signal indicating the absence of the anti-theft function and the "1" output of the AND gate 16E. The engine control section 16K is activated by the start permit signal to carry out the predetermined engine start and travel control.

The operation of the above embodiment will now be described. The enable code mentioned above in relation to FIG. 4 is supplied from an input terminal 24 of the theft detector 22 to the noise eliminating circuit 26 and then it is transferred to the code determining circuit 28. When it is determined that the enable code is legitimate by, for example, comparing prestored it with the reference code in the code determining circuit 28, the code determining circuit 28 generates a validation signal of a predetermined format at the output terminal Pd. The validation signal is comprised of, for example, a pulse train of a predetermined known frequency and duty ratio. The output obtained when no enable code is supplied may be continuously at high level.

In FIG. 2, the validation signal is supplied at the port Pm of the engine control circuit 16. The engine control circuit 16 determines whether the signal received through port Pm is the predetermined validation signal or not in accordance with the procedure to be discussed later, and causes the engine control circuit 16 to perform the engine control operation or disables it in accordance with the determination result. The port Pm is connected to the operation voltage via resistor R to be pulled up, so that the input of port Pm is maintained at a fixed voltage when the theft detector means 22 is removed.

The validation signal discriminating operation of the engine control circuit 16 is described with reference to the aforementioned diagrams and the flowchart of FIG. 3. In the experiment of the present inventors, the validation signal discrimination process was determined to be performed, for instance, at every 10 ms by the timer interruption of the engine control circuit 16. The cycle of the timer interruption or the sampling interval is determined by the relationship with the cycle of the validation (pulse) signal which is a signal to be detected. In general, from the well-known sampling theorem, it is only required that the interrupt cycle be equal to or shorter than ½ of the pulse cycle.

Figure 3:
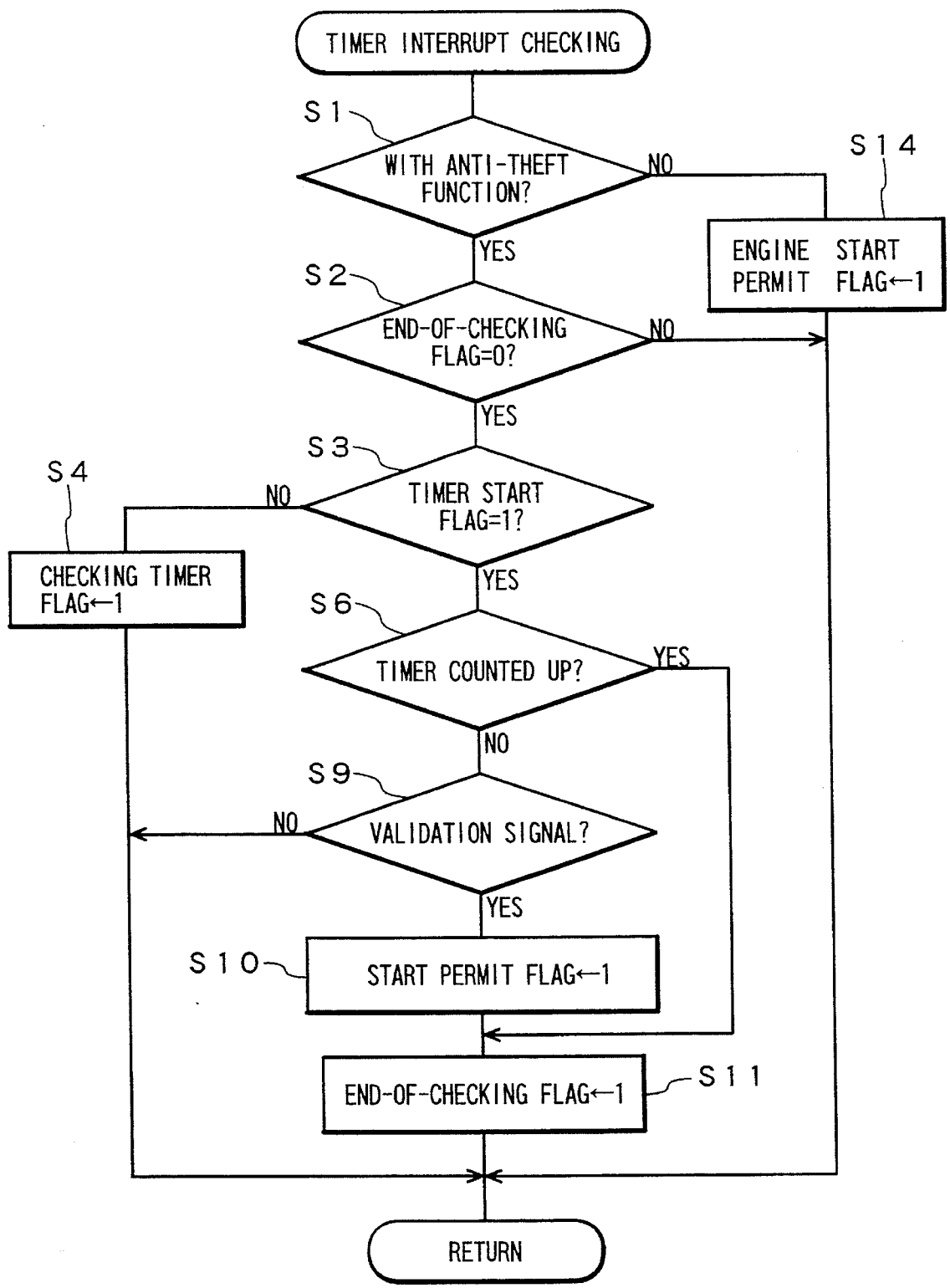
FIG. 3 is a flowchart showing an operation of the present invention.

In step S1 in FIG. 3, it is determined, based on the divided voltage by voltage dividing resistors 29 and 29A, whether or not the vehicle in question is equipped with an anti-theft function. For instance, if the divided voltage is 0 V, it is determined that the anti-theft function is not provided, and if 4 V, it is determined that the anti-theft function is provided. If desired, it can be decided what the class or type of its specification is, in other words, what the destination of the particular vehicle However, since the present invention is not pertinent to determination of the destination of the vehicle, the description is made here on the assumption that only the provision of the anti-theft function is to be determined.

In FIG. 1, this determination is made in the anti-theft function provision determining means 16A. If it is determined that there is no anti-theft function, the process goes to step S14 to set an engine start permit flag to "1". In FIG. 1, the anti-theft function provision determining means 16A enables a start permit signal generator circuit 16G to cause an engine control means 16K to perform an engine start-up control.

If it is determined in step S1 that an anti-theft function is provided, it is discriminated in step S2 whether or not an end-of-checking flag is "0", or if a checking time has not expired yet. The checking time will be described in detail later. In FIG. 1, this discrimination corresponds to whether or not the checking timer 16C has timed up to generate the output "0". First, the end-of-checking flag is "0", and thus the process goes to step S3 to determine whether or not a checking timer start flag is "1" (that is, whether or not the timer 16C for measuring the preset checking period has been started). If the timer has not started yet, it is started and the timer start flag is set to "1" in step S4. The process of FIG. 3 temporarily returns to the main routine (not shown), and the process of FIG. 3 is resumed by the next timer interruption. These processes correspond to the operation in FIG. 1 in which the anti-theft function provision determining means 16A initiates the checking timer 16C to set its output at "1", and open the AND gate 16E when it is determined that there provided the anti-theft function is provided in dependence on the divided voltage of the dividing resisters 29 and 29A.

Since all discriminations in steps S1 to S3 become positive in the subsequent processings, the process goes to step S6 to determine whether or not the time set in the checking timer 16C (in this example, 2.2 sec) has expired. Since it has not yet expired yet at the beginning, it is determined in step S9 whether or not the validation signal has been correctly received from the theft detector means 22. The process returns to the main routine if the judgement is negative in step S9. Since the inserted ignition key can be determined to be legitimate if the validation signal is received and confirmed while the above processings are repeated, the engine start permit flag is set to "1" in step S10 and the end-of-checking flag is set to "1" in step S11, terminating the signal discrimination operation.

On the other hand, if the judgement in step S9 is not positive and hence the checking time expires while the end-of-checking flag is still zero, the discrimination in step S6 becomes positive, the process goes to step S11, and the end-of-checking flag is set to "1". In other words, it is determined that no validation signal has been received in the theft detector means 22, that is, the ignition key operation is illegal, and the checking operation is terminated in step S11 while keeping the engine start-up disabled. These processings correspond to the operation in FIG. 1 in which the output of the checking timer 16C turns to "0" due to its count up, and the gate 16E is closed to inhibit transfer of the validation signal to the start permit signal generator 16G from the theft detection means 22.

When the engine start permit flag is set to "1" in step S10, the engine is controlled to start-up. Since the discrimination in step S2 becomes negative if the end-of-checking flag is set to "1", the remaining processings in FIG. 3 are skipped. Thus, the start-up of the engine and the driving are allowed when a legitimate ignition operation is performed, but it is inhibited for a wrong or an illegal key operation by a theft or the like.

In the embodiment described above, the determination is completed by only one receipt of the validation signal through port Pm. It will be easily understood that the validation signal may be received a plurality of times within the checking time before the engine start is allowed. The theft detector means 22 can be demountably mounted on the circuit board of the engine control circuit, therefore, it is possible to use engine control circuit which is common to both a vehicle equipped with the anti-theft function and a vehicle not equipped with it; that is, the theft detector means 22 is mounted on the circuit board in the case of a vehicle which is equipped with the anti-theft function, while the theft detector means 22 is not mounted in the case of a vehicle which is not equipped with the anti-theft function. As it is understood from the above description, in latter case, the signal level at port Pm of the engine control circuit 16 is not referred to; however, as shown by the dashed line in FIG. 2, pull-up resistor R should be provided to maintain the signal level at a fixed potential.

In the embodiment described above, the theft detector means 22 receives, decodes, and checks the enable code from the separately provided immobilizer. As an alternative, the theft detector means itself may detect, decode, and check the key code ID and generate the ID signal which indicates that legitimate starting operation is being carried out.

According to the present invention, since the theft detector means 22 is demountably mounted on the circuit board of the engine control circuit 16, it is possible to standardize the specifications (circuit board structure, processing software, etc.) of the engine control circuit regardless of whether the vehicle is equipped with the anti-theft device or not, leading to an advantage of reduced cost. Furthermore, in the case of a vehicle equipped with the anti-theft device, the feature according to the present invention can be achieved simply by adding a decoder means which is demountably mounted. In this case, molding the theft detector means and the engine control circuit into a single piece also prevents an attempt of unauthorized operation of the engine control unit by accessing a connection or wiring between the theft detector means and the engine control circuit. In the manufacturing process, whether the decoder means is added or not can be visually and easily checked, permitting easier and secure operation and inspection. Moreover, a faulty theft detector means can be easily replaced, leading to improved operability and lower repairing cost.

What is claimed is:

1. A vehicle anti-theft engine control device comprising:

an engine control means for controlling a start of an engine in response to a start permit signal;

an anti-theft function provision determining means for determining whether said engine is equipped with an anti-theft device or not and for issuing a signal indicating the presence of the anti-theft function or a signal indicating the absence of the anti-theft function;

a theft detector means for receiving and checking an ID signal indicating a legitimate starting operation of the engine and issuing a validation signal; and means for issuing a start permit signal in response to one of the validation signal from said theft detector means and the signal indicating the absence of the anti-theft function; said theft detector means being demountably mounted on a circuit board of said engine control means.

2. A vehicle anti-theft engine control device according to claim 1, wherein said anti-theft function provision determining means and said start permit signal issuing means are disposed on a circuit board of said engine control means.

3. A vehicle anti-theft engine control device according to claim 1, further comprising a timer means that is activated in response to the signal indicating the presence of the anti-theft function and prohibiting supply of said validation signal to said start permit signal issuing means when a preset time of the timer means has elapsed.

4. A vehicle anti-theft engine control device according to claim 1, wherein said anti-theft function provision determining means receives a divided voltage of a voltage dividing means connected between an operating power supply and a reference potential and determines whether the vehicle anti-theft device is provided or not in accordance with the value of said divided voltage.

* * * * *